R. C. PRYOR.
WAGON BRAKE.
APPLICATION FILED FEB. 26, 1908.

904,361.

Patented Nov. 17, 1908.
2 SHEETS—SHEET 1.

WITNESSES

INVENTOR
Rufus C. Pryor
BY
ATTORNEYS

R. C. PRYOR.
WAGON BRAKE.
APPLICATION FILED FEB. 26, 1908.
904,361.
Patented Nov. 17, 1908.
2 SHEETS—SHEET 2.
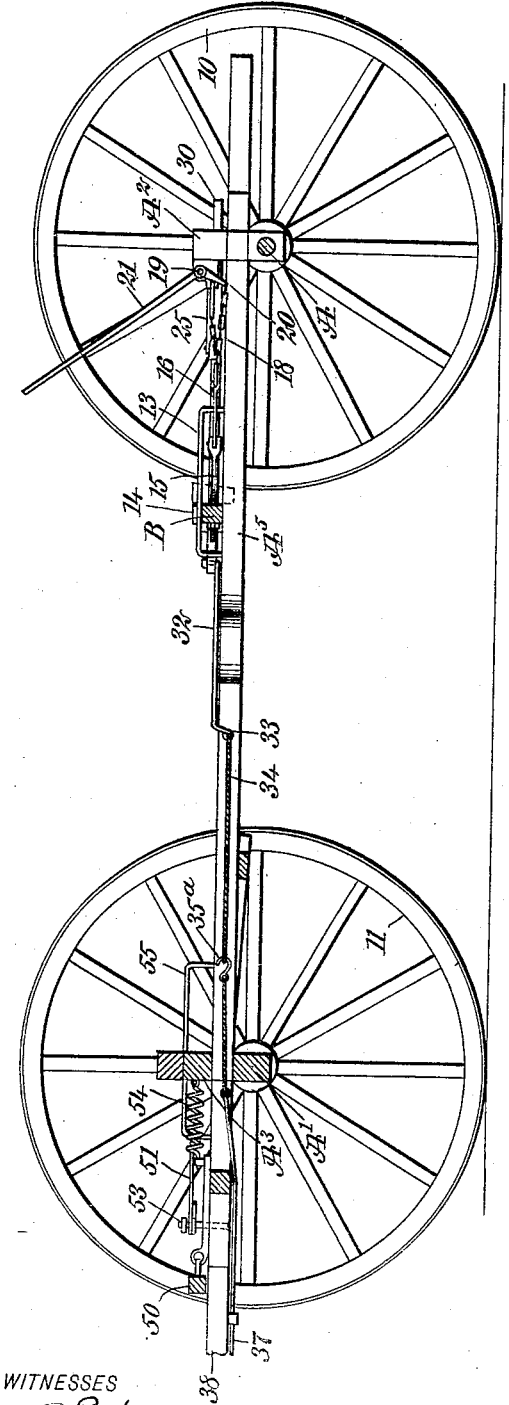
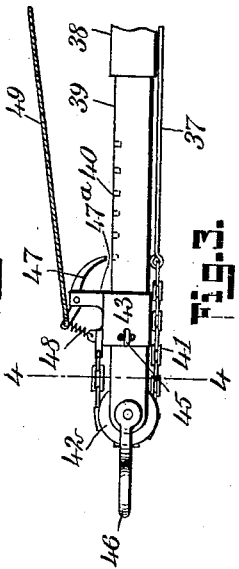
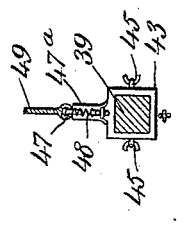
WITNESSES
INVENTOR
Rufus C. Pryor
BY
ATTORNEYS

UNITED STATES PATENT OFFICE.

RUFUS C. PRYOR, OF NEAR WOLFSVILLE, MARYLAND, ASSIGNOR OF ONE-HALF TO CLAUDE U. STOTTLEMYER, OF NEAR WOLFSVILLE, MARYLAND.

WAGON-BRAKE.

No. 904,361.       Specification of Letters Patent.       Patented Nov. 17, 1908.

Application filed February 26, 1908. Serial No. 417,848.

*To all whom it may concern:*

Be it known that I, RUFUS C. PRYOR, a citizen of the United States, and a resident near Wolfsville, in the county of Frederick and State of Maryland, have invented a new and useful Improvement in Wagon-Brakes, of which the following is a full, clear, and exact description.

The purpose of the invention is to provide a brake for vehicles which can be automatically applied by the backing of the team, and wherein the automatic brake mechanism can be rendered inactive at the will of the driver.

A further purpose of the invention is to provide a brake mechanism of the character described that will be simple economic, and positive in its action.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1:
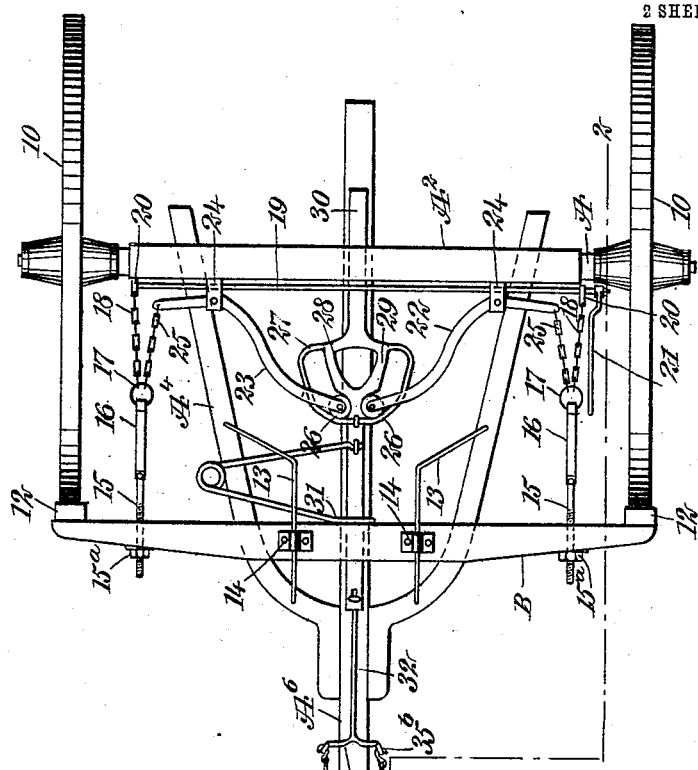
Figure 1:
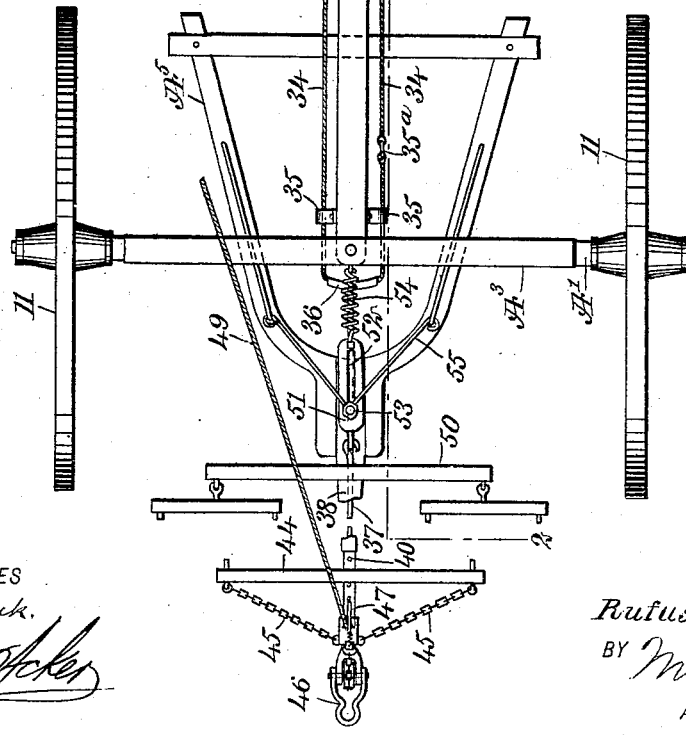

Figure 1 is a plan view of the running gear of a vehicle having the improved brake mechanism applied thereto; Fig. 2 is a section taken practically on the line 2—2 of Fig. 1; Fig. 3 is a detail side elevation of the forward portion of the tongue of the vehicle, and Fig. 4 is a section taken practically on the line 4—4 of Fig. 3.

A represents the rear axle of the running gear of a vehicle, A′ the forward axle, A² the rear bolster, A³ the forward bolster, A⁴ the rear hounds and A⁵ the forward hounds. The rear axle A is provided with the customary wheels 10, and the forward axle A′ with similar wheels 11. B represents the brake bar, which is provided with the usual brake shoes 12, for engagement with the peripheral portions of the rear wheels 10. This brake bar B is guided in its movement to and from the rear wheels by bars 13, secured to the rear hounds A⁴, and passing through suitable guides 14 secured upon the said brake bar, as is illustrated in Fig. 1. The brake bar is provided adjacent to each of its ends with a threaded rod 15, that passes through it and is provided at its forward end with a nut 15ᵃ, as is illustrated in Fig. 1. These threaded rods 15 are pivotally connected with links 16, and these links 16 are provided at their rear ends with rings 17, or their equivalents, and chains 18 are connected to said rings and to a shaft 19, that is mounted upon the forward portion of the bolster A², as is also shown in Fig. 1, so that the brakes can be applied by hand if desired. In making the connection between the brake bar B and the shaft 19, the chains 18 are secured to crank arms 20 that extend from the shaft 19, and at one end of the said shaft 19, a lever 21 is secured whereby to apply the brakes when necessary by hand. Brake actuating arms 22 and 23 are also employed at the rear portion of the said running gear, being located in front of the rear axle A. These arms 22 and 23 are pivoted in offsets 24 from the bolster A², and their outer ends, which are straight, are connected by chains 25 with the aforesaid rings 17, to which the chains 18 are connected. The inner portions of the arms 22 and 23 are curved forwardly and inwardly, and are provided at their inner ends with friction rollers 26, which friction rollers are located within a guard rail 27 that surrounds opposing inclined planes 28 and 29, that are formed upon an operating bar 30 for the brakes, which operating bar 30 is located over the reach A⁶ of the said running gear, which reach may be of any suitable construction. A spring 31 is coiled around the operating brake bar 30, which controls the actual brake bar B in an automatic manner to be hereinafter described, and the said spring 31 serves to hold the brake actuating arms 22 and 23 in such position that the brake shoes 12 are out of engagement with the rear wheels 10. The brake operating bar 30 is attached at its forward end to a rod 32 which is provided at its forward end with a cross bar 33, and this cross bar 33 has attached to it at each of its ends, a cable or a chain 34, the ends whereof are connected by a hook 35ᵃ, as is shown in Fig. 1, and hooks 35ᵇ may be provided for attaching the said chain or cable 34 to the said head 33 of the bar 32. This chain or cable 34 passes at each side of the reach A⁶ and is carried through guides 35 also attached to the said reach, and the forward portion of the said chain or cable 34 extends beyond and above the forward axle A′ and is provided with a reinforcing tube 36, to which tube 36 the rear end of a rod 37 is attached, which rod is carried below the tongue 38. The tongue 38 at its forward end, as is shown in Fig. 3, is made square in cross section, as is indicated at 39 in Figs. 3 and 4, and the square portion 39 of the tongue is provided with a series of apertures or recesses 40 in its upper face. A chain 41 is secured to the outer end of the rod 37 located beneath the tongue, and which may be termed a draft rod, and this chain 41, or a cable may be substituted for said chain, is carried over a pulley 42, that is located at the forward end of the aforesaid tongue 38, and the said chain or cable 41 after being passed over the pulley 42 is carried rearward over the upper portion of the tongue and is attached to a slide 43, mounted upon the square portion 39 of said tongue. This slide 43 is adapted to be connected in any suitable or approved manner with a yoke, a yoke strap, or breast chain of the harness. As is illustrated, the said slide 43 is connected with the breast yoke 44 by means of chains 45, the said yoke 44 being suitably connected with the harness. A clevis 46 is also shown attached to the forward end of the pole, whereby to enable extra horses to be attached. The slide 43 is provided at its upper portion with an upwardly extending arm $47^a$, and in this arm a pawl 47 is pivoted, one end of which pawl extends over the recesses 40 in the pole and is adapted to enter said recesses, while the opposite end of the said pawl is connected with a spring 48 that is secured to the said slide 43, and the spring 48 normally serves to hold the pawl out of engagement with the recessed portion of the said tongue. A rope 49, or the equivalent thereof, is connected with the spring-controlled end of the pawl and is carried in any suitable or approved manner to the driver.

It is obvious that under ordinary circumstances, when the team is backed in going down an incline for example, the draft rod 37 will be drawn forward and will draw with it the operating bar 30, carrying the said bar in a forward direction, and as the said draft bar travels forwardly, the rollers 26 on the brake actuating arms 22 and 23 will travel down the inclined planes 28 and 29 to the diverging points of said planes and in so doing will cause the said brake actuating arms to rock and their outer ends to draw upon the connection with the brake bar B, and thus apply the brake shoes 12 to the rear wheels 10 proportionately to the backing action of the team.

In the event that it is desired to back the team without applying the brakes to the vehicle, then the rope 49 is drawn upon and the pawl 47 is carried downward so as to enter one or the other of the recesses 40 in the square portion 39 of the pole, and at such time the automatically controlled medium for setting the brakes will be put out of action. This brake mechanism is exceedingly simple, it is durable, and is economic, and it will positively act under all conditions.

The draft tree 50 for the team is attached to a slide 51, and this slide 51 is provided with a longitudinal slot 52, through which slot a pin 53 extends, attached to the forward portion of the forward hounds, as is particularly shown in Figs. 1 and 2, and a spring 54 is secured to said slide and to the forward bolster $A^3$ or other convenient support, which spring acts to draw the draft tree 50 rearward when the team is backing, so that the swingle trees will not hamper the team by coming in contact with their legs, since the spring 54 will draw the draft tree at such time to the rear. The pin 53 is sustained by means of suitable braces 55, attached to the forward hounds $A^5$.

In order to set the brakes by backing the horses as little as possible, the forward portions of the inclined planes 28 and 29, are made very abrupt, which will cause the arms 22 and 23 to be thrown apart with a very slight movement of the brake operating bar 30, which has sliding movement over the reach through a suitable opening in the rear bolster $A^2$.

Having thus described my invention, I claim as new and desire to secure by Letters Patent,—

1. In vehicles, the combination with the running gear, the brake bar, and shoes carried thereby, of a tension-controlled sliding bar provided with opposing inclined planes, brake actuating arms engaging said inclined planes, connections between said arms and the brake bar, and means adapted to be operated by the resistance of the draft medium for operating the sliding bar to move the actuating arms over said inclined planes.

2. In vehicles, the combination with the running gear, and a brake bar carried thereby, of a spring actuated sliding bar having opposing inclined planes, pivoted brake actuating arms engaging said inclined planes, connections between the said arms and the brake bar, and means for connecting the sliding bar with the harness.

3. In vehicles, the combination with the running gear, and a sliding brake bar carried thereby, of a spring actuated sliding bar having opposing inclined planes, pivoted brake actuating arms engaging the inclined planes, connections between the said arms and the brake bar, a slidable breast yoke carried by the tongue of the running gear, and connections between the breast yoke and sliding bar.

4. In vehicles, the combination with the running gear, the brake bar and shoes carried thereby, of a brake actuating bar mounted to slide over the reach of the running gear, which actuating bar is provided with opposing inclined planes, arms pivotally mounted and connected with the brake bar, which arms are in engagement with said inclined planes, a slide mounted upon the tongue of the running gear, means for connecting the slide with the harness, and connections between said slide and said bar.

5. In vehicles, the combination with the forward and the rear axles, the tongue, the reach, and a brake bar movable to and from the rear axle, of a brake actuating bar mounted for sliding movement over the reach, inclined planes at opposite sides of the brake actuating bar, brake actuating arms fulcrumed upon the said rear axle, the inner ends whereof are in engagement with the said inclined planes, connections between the brake actuating arms and the brake bar, a friction roller at the forward end portion of the tongue, a neck yoke, and a flexible connection between the said neck yoke and the said brake actuating bar, which connection is passed over said pulley.

6. In vehicles, the combination with the forward and the rear axles, the tongue, the reach, and a brake bar movable to and from the rear axle, of a brake actuating bar mounted for sliding movement over the reach, inclined planes at opposite sides of the brake actuating bar, brake actuating arms fulcrumed upon the said rear axle, the inner ends whereof are in engagement with the said inclined planes, connections between the brake actuating arms and the brake bar, a friction roller at the forward end portion of the tongue, a neck yoke, a flexible connection between the said neck yoke, and the said brake actuating bar, which connection is passed over said pulley, a spring controlling the movement of the brake operating bar in one direction, and means for locking the brake mechanism against operation.

7. In a vehicle, the combination with the rear and the forward axles, the reach, a brake bar movable to and from the rear axle, shoes carried thereby, a brake operating bar mounted for movement over the reach, having inclined planes at opposite sides, brake actuating arms pivoted upon the said rear axle, the inner ends whereof are in engagement with the said inclined planes, guides for the said arms carried by the brake actuating bar, and connections between the said arms and the brake bar, of a pulley at the forward end of the tongue of the vehicle, a rod mounted to slide beneath the said tongue, flexible connections between the said rod and the brake actuating bar, a forward section of harness, a flexible connection between the said section of harness and the said rod, which connection passes over the said pulley, and a spring-controlled pawl adapted for engagement with depressions in the said tongue to prevent the operation of the brake mechanism when not needed.

8. In vehicles, the combination with the running gear, the tongue provided with recesses adjacent to its forward end, and a brake mechanism, of a slide on the forward end of the tongue and provided with a projection, a connection between the slide and brake mechanism, a pawl pivoted to the projection of the slide and adapted to engage the recesses of the tongue, a spring for normally holding the pawl out of engagement with the said recesses, and means for operating the pawl from the vehicle.

In testimony whereof I have signed my name to this specification in the presence of two subscribing witnesses.

RUFUS C. PRYOR.

Witnesses:
JOHN W. HOOVER,
CLAUDE U. STOTTLEMYER,